(12) United States Patent
Sung et al.

(10) Patent No.: US 9,013,758 B1
(45) Date of Patent: Apr. 21, 2015

(54) SCANNED IMAGE CALIBRATION DEVICE AND METHOD THEREOF FOR ADJUSTING A SCAN FREQUENCY

(71) Applicant: Foxlink Image Technology Co., Ltd., New Taipei (TW)

(72) Inventors: Chang Hsien Sung, New Taipei (TW); Pin Kuan Chou, New Taipei (TW); Te Yi Wang, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 14/058,130

(22) Filed: Oct. 18, 2013

(51) Int. Cl.
*H04N 1/00* (2006.01)
*H04N 1/60* (2006.01)

(52) U.S. Cl.
CPC ....... *H04N 1/00087* (2013.01); *H04N 1/00063* (2013.01); *H04N 1/00037* (2013.01); *H04N 1/00031* (2013.01); *H04N 1/00018* (2013.01); *H04N 1/00602* (2013.01); *H04N 2201/0001* (2013.01); *H04N 2201/0063* (2013.01); *H04N 2201/0081* (2013.01); *H04N 2201/0458* (2013.01); *H04N 1/00002* (2013.01); *H04N 1/6055* (2013.01)

(58) Field of Classification Search
None
See application file for complete search history.

(56) References Cited

U.S. PATENT DOCUMENTS

| | | | |
|---|---|---|---|
| 2009/0185244 A1* | 7/2009 | Ogata | 358/498 |
| 2011/0064424 A1* | 3/2011 | Knausdorf et al. | 399/16 |
| 2014/0104661 A1* | 4/2014 | Guan et al. | 358/498 |

* cited by examiner

Primary Examiner — Miya J Cato
(74) Attorney, Agent, or Firm — Lin & Associates IP, Inc.

(57) ABSTRACT

A device for calibrating scanned image includes a scanning unit arranged in a paper transmitting path for capturing texts and images on a document and transferring into electrical signals, a set of transmitting device which includes at least a first transmitting roller arranged upstream to the scanning unit, and a second transmitting roller arranged downstream to the scanning unit. There is no other transmitting roller arranged between the first and the second transmitting rollers, the distance between the first and the second transmitting rollers is shorter than the length of the document, and the second transmitting roller is faster than the first transmitting roller. A paper sensor is arranged in the paper transmitting path for detecting the position and the velocity of the document, and a control unit is connected with the paper sensor and the scanning unit to adjust the scan frequency in response to the position and the velocity of the document.

2 Claims, 9 Drawing Sheets

--- transmitting the document through the scanning unit page by page with the first and the second transmitting rollers, meanwhile detecting the position and the velocity of the document with the document sensor

↓ starting the scanning unit to capture the text and image on the document when the document sensor detecting the document being passing through the scanning unit

↓ adjusting the scan frequency of the scanning unit when the document sensor detecting the transmitting state or velocity of the document changed

↓

After the document finishes the scanning and leaves the scanning unit 50, all of the scan line will be put together to form a complete image

Fig. 4 transmitting the document through the scanning unit page by page with the first and the second transmitting rollers, meanwhile detecting the position and the velocity of the document with the document sensor starting the scanning unit to capture the text and image on the document when the document sensor detecting the document being passing through the scanning unit adjusting the scan frequency of the scanning unit when the document sensor detecting the transmitting state or velocity of the document changed After the document finishes the scanning and leaves the scanning unit 50, all of the scan line will be put together to form a complete image

SCANNED IMAGE CALIBRATION DEVICE AND METHOD THEREOF FOR ADJUSTING A SCAN FREQUENCY

BACKGROUND OF THE INVENTION

1. Field of the Invention

The present invention relates to a device for calibrating scanned image and a method thereof, especially to the device and method for calibrating image by digital control.

2. The Related Art

Figure 1:
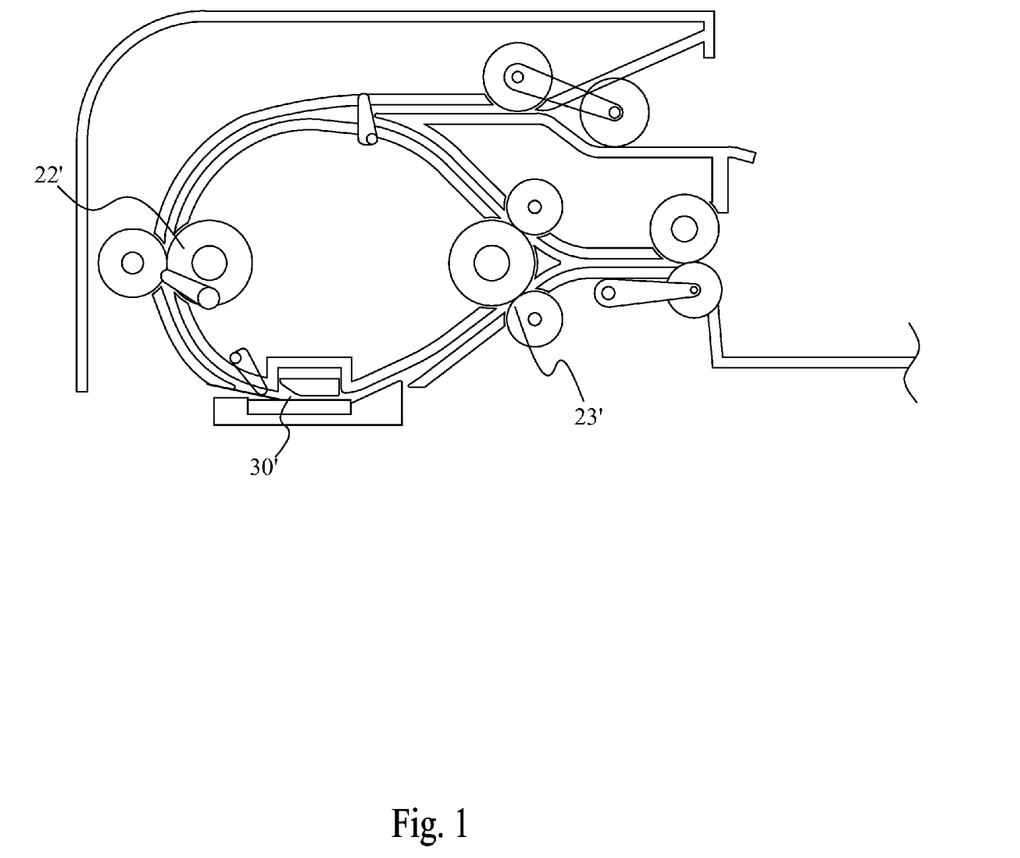

Referring to FIG. 1, a common automatic document feeder uses a plurality of rollers 22', 23' to transmit documents from an input tray to a scanning device 30' for capturing the images and texts printed on a document. In order to keep the document flat, the roller 23' arranged downstream rolls faster than the roller 22' arranged upstream. By using the velocity difference of the upstream and downstream rollers 22', 23' to pull and flatten the document.

Figure 2:
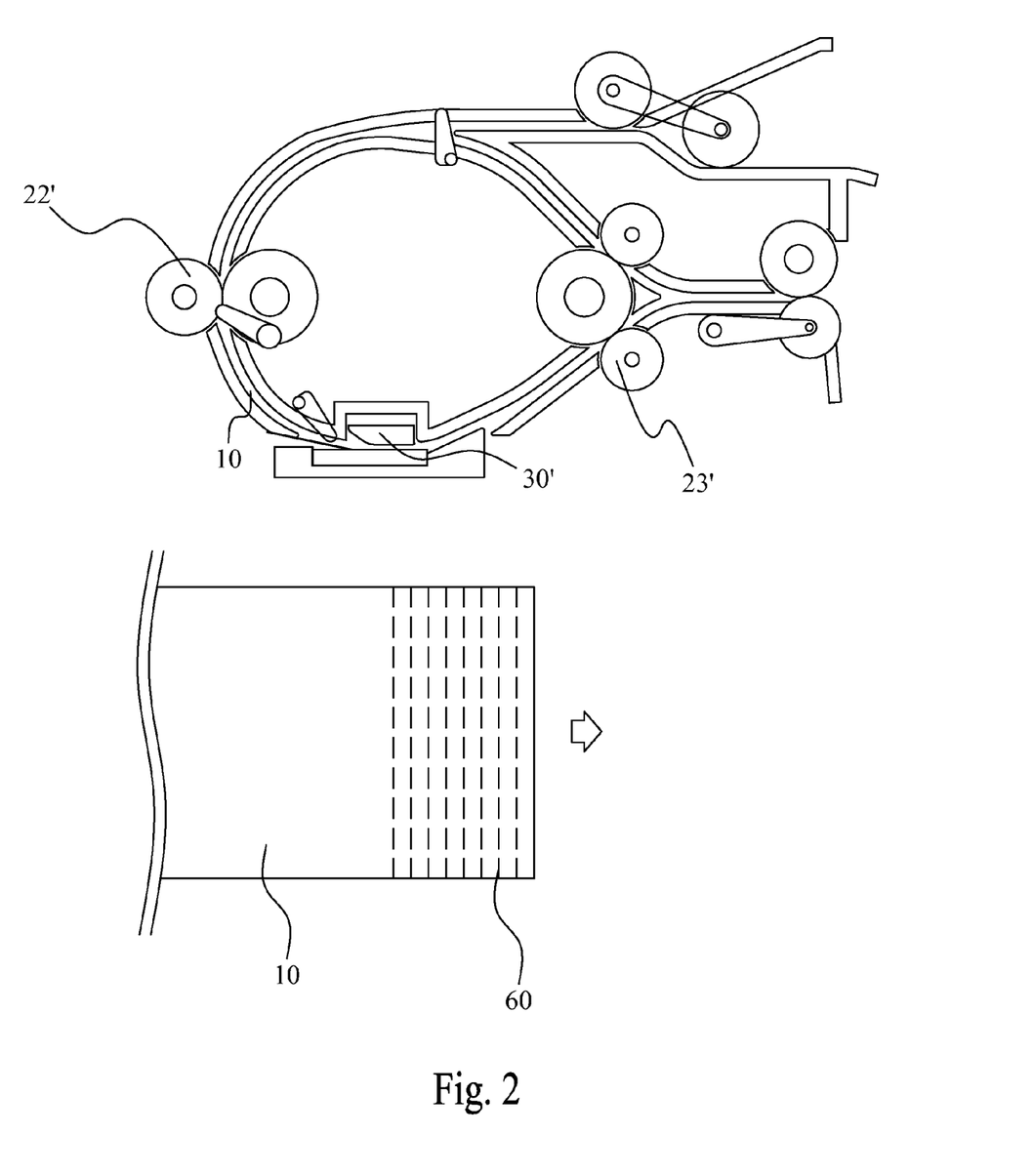
FIG. 2 and FIG. 3 are schematic diagrams that show the transmitting velocity change causing the scanned image defects.

Referring to FIG. 2, when the document 10 passes through the scanning device 30', the scanning device 30' will capture a stripe of image from the surface of the document. In order to describe more easily, said stripe of image will be defined as scan lines 60 below. Because the scanning device 30' captures the image in a constant frequency, the distance between two successive scan lines 60 is also the same. After the whole document is transmitted through the scan device 30', all of the scan lines 60 will be put together and form a completed image.

Figure 3:
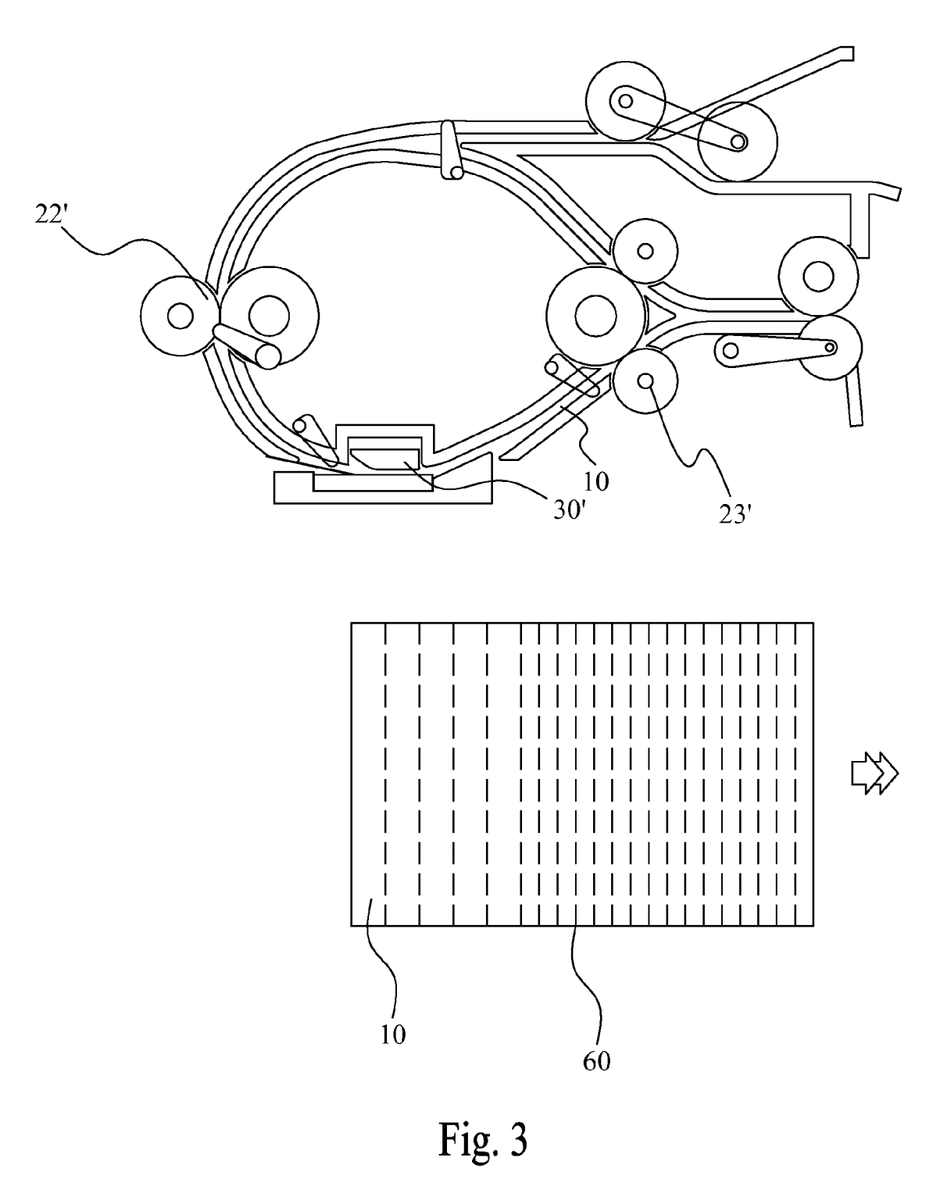

Referring to FIG. 3, because the completed scan image is assembled with each of scan lines 60, and the distance between each scan lines 60 will change with the transmitting speed of the document 10, so the scale of the scanned image along the transmitting direction will change greatly according to the acceleration or deceleration of the document. And the most common reason of velocity change is caused by the velocity difference of the upstream roller 22' and the downstream roller 23'. When the following end of the document 10 is leaving the upstream roller 22', the document 10 will accelerate instantly with the pulling of the downstream roller 23' and enlarge the distance between each scan line 60.

To avoid the scale of the scanned image changing, there are a variety of technical solutions for preventing the document from accelerating when the following edge thereof leaves the upstream roller 22'. Such as the solution disclosed in the U.S. Pat. No. 3,988,817 uses different types of material to construct rollers, so the document can leave the roller much more slowly, and thus avoid the prompt acceleration. And solution disclosed in the U.S. Pat. No. 6,530,569 uses an actuator which is connected with the roller to move the roller away from the document slowly when the document is leaving the roller, and thus avoid the prompt acceleration.

However, the roller constructed by two or more kinds of material is apt to fail to work when the softer part wears out, on the other hand, mounting an additional actuator will increase the product cost. Therefore, it is necessary to improve the conventional automatic document feeder.

SUMMARY OF THE INVENTION

An objective of this invention is to provide an image calibrating device for a document scanner which is easy to be maintain and to be produced.

To achieve the objective, the image calibrating device includes a scanning unit arranged in a paper transmitting path for capturing texts and images on the document and transferring into electrical signals, a set of transmitting device including at least a first transmitting roller and a second transmitting roller that rotates faster than the first transmitting roller, the first transmitting roller being arranged upstream to the scanning unit, the second transmitting roller being arranged downstream to the scanning unit, the distance between the first and the second transmitting rollers being shorter than the length of document, and there is no other transmitting roller being arranged between the first and the second transmitting rollers, a paper sensor arranged in the paper transmitting path for detecting the position and the velocity of the document, and a control unit connected with the paper sensor and the scanning unit to adjust the scan frequency in response to the position and the velocity of the document.

And the method for calibrating scanned image is described below:

transmitting the document through the scanning unit page by page with the first and the second transmitting rollers, wherein the first transmitting roller being arranged upstream to the scanning unit, the second transmitting roller which rotates faster than the first roller being arranged downstream to the scanning unit, there is no other transmitting roller being arranged between the first and the second transmitting roller, the distance between the first and the second transmitting roller being shorter than the length of the document, detecting the position and the velocity of the document with the document sensor, starting the scanning unit to capture the text and image on the document when the document sensor detecting the document being passing through the scanning unit, and adjusting the scan frequency of the scanning unit when the document sensor detecting the transmitting state or velocity of the document changed.

In summary, the device in this invention calibrates scanned image by adjusting the scan frequency according to the transmitting state and the velocity changes of the document. Therefore, there is no need for the image calibrating device in this invention to use any additional actuator and components, so it will not failure due to mechanical wear. Thus the image calibrating device in this invention is easy to be produced and maintain.

BRIEF DESCRIPTION OF THE DRAWINGS transmitting the document through the scanning unit page by page with the first and the second transmitting rollers, wherein the first transmitting roller is arranged upstream to the scanning unit, the second transmitting roller which rotates faster than the first roller is arranged downstream to the scanning unit, there is no other transmitting roller being arranged between the first and the second transmitting rollers, and the distance between the first and the second transmitting rollers is shorter than the length of the document; detecting the position and the velocity of the document with the document sensor; starting the scanning unit to capture the text and image on the document when the document sensor detects the document being passing through the scanning unit; and adjusting the scan frequency of the scanning unit when the document sensor detects change in the transmitting state or velocity of the document.

In summary, the device in this invention calibrates scanned image by adjusting the scan frequency according to the transmitting state and the velocity changes of the document. Therefore, there is no need for the image calibrating device in this invention to use any additional actuator and components, so it will not fail due to mechanical wear. Thus the image calibrating device in this invention is easy to be produced and maintain.

DETAILED DESCRIPTION OF THE PREFERRED EMBODIMENT

Figure 4:
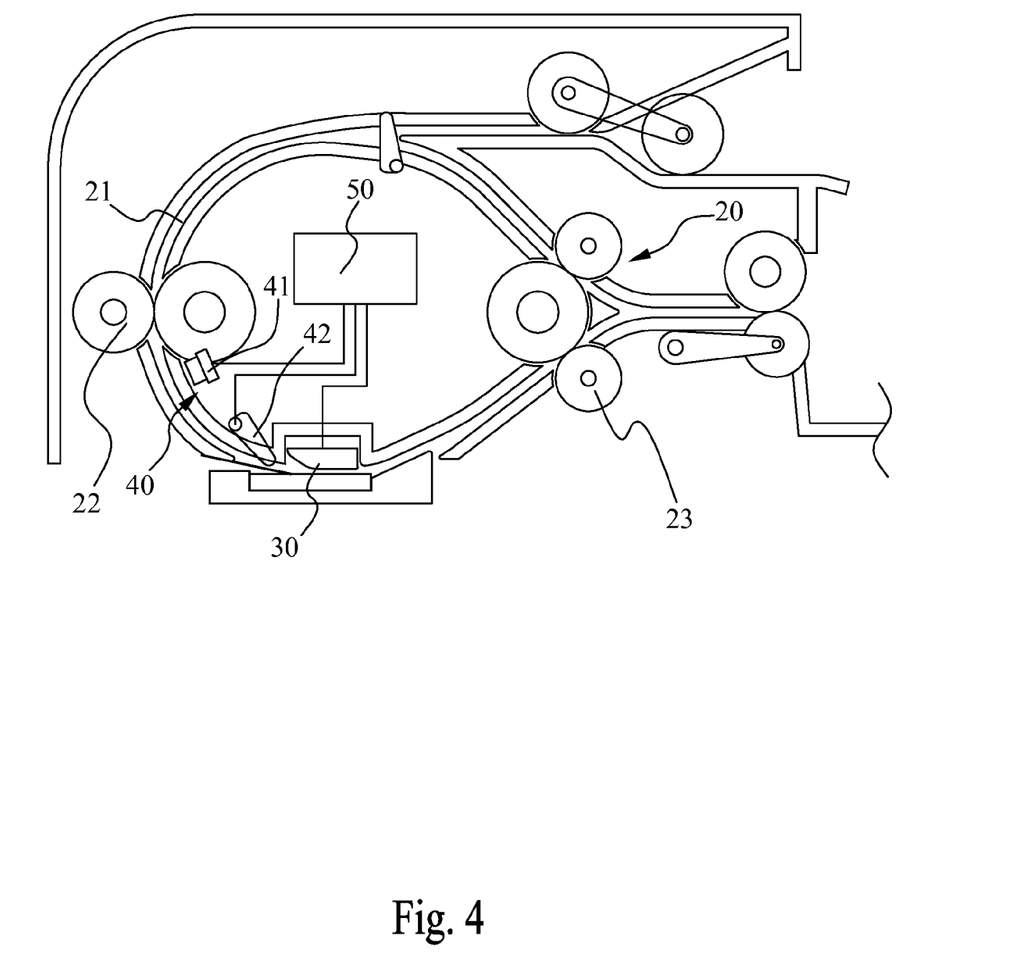
FIG. 4 shows a cross-sectional view of the scanned image calibrating device in this invention.

Referring to FIG. 4, it is known that the document will accelerate when the following end of a document leaves the transmitting roller, and thus make the scanned image shorter than the original image printed on the document. In order to solve said problem, the scanned image calibrating device in this invention includes: a scanning unit 30 arranged in the transmitting path 21 for scanning and transferring image and texts on the original into electrical signals. A transmitting device 20 that includes at least a first transmitting roller 22 and a second transmitting roller 23, wherein the first transmitting roller 22 is arranged upstream to the scanning unit 30, the second transmitting roller 23 is arranged downstream to the scanning unit 30, there is no other transmitting roller settled between the first and second transmitting rollers 22, 23, the second transmitting roller 23 rotates faster than the first transmitting roller 22, and the distance there between is shorter than the length of the document. A document sensor 21 is arranged in the transmitting path 21 for detecting the position and the velocity of the document, and a control unit 50 is connected with the scanning unit 30 and the paper sensor 40 for adjusting the scan frequency of the scanning unit 30 in response to the velocity or position change of the document (not shown) to calibrate defects caused by velocity change of the document.

The paper sensor 40 in this embodiment includes a paper pass sensor 41 and a scan sensor 42, the paper pass sensor 41 is arranged next to the first transmitting roller 22 and the scan sensor 42 is arranged next to the scanning unit 30. The paper pass sensor 41 and the scan sensor 42 are arranged to detect the moment of the document when the document passes through the first transmitting roller 22 and when the document leaves the scanning unit 30 respectively. When the document is passing through the first transmitting roller 22 or leaving the scanning unit 30, the paper sensor 40 will send a signal to the control unit 50 to adjust the scanning mode.

Wherein, the scan sensor 42 is a micro switch sensor which will be active when the document passes through the scan sensor 42, and the paper pass sensor 41 is an ultrasonic sensor which can measure thickness of the document. Therefore, the paper pass sensor 41 in this invention can detect both statements of document passing through the paper pass sensor 41 and multi-feed.

Figure 5:
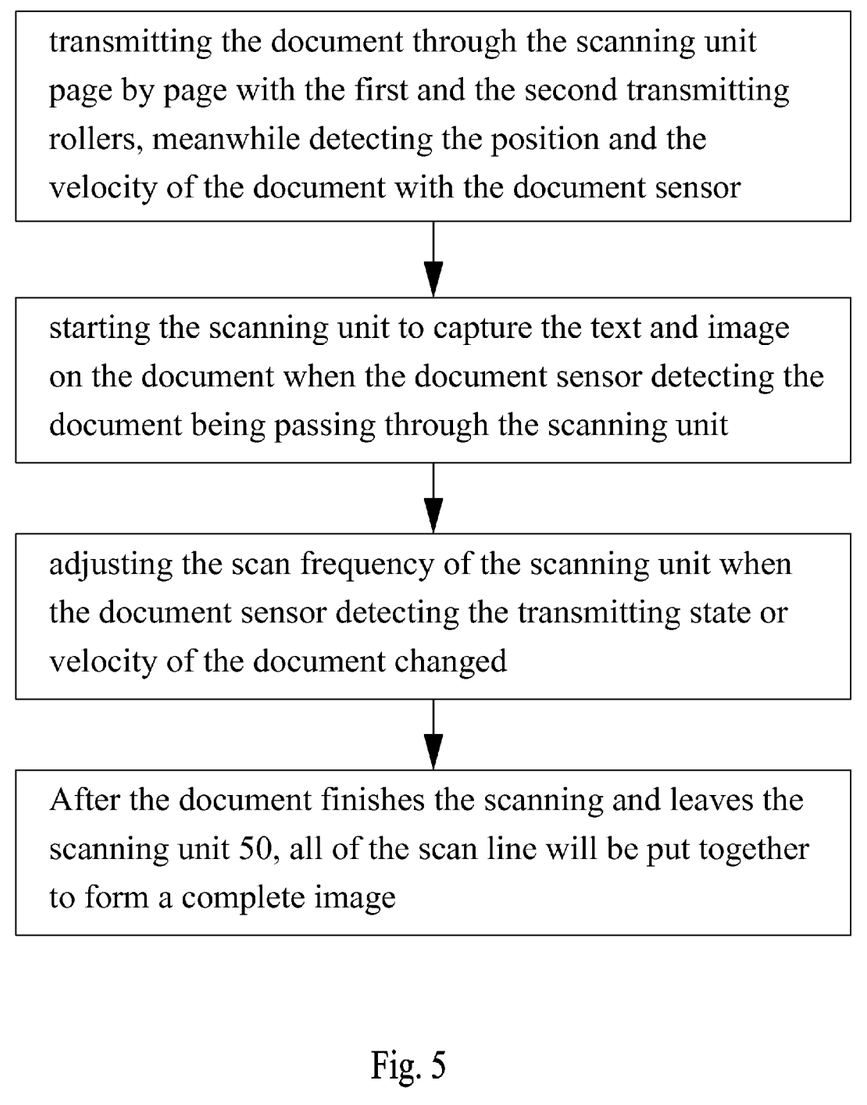
FIG. 5 shows a process diagram of calibrating scanned image in this invention.

Referring to FIG. 5, the process of calibrating scanned image are shown as follow:

When the automatic feeding scanner starts to scan, the document will be transmitted through the transmitting path 21 page by page with the transmitting device 20, meanwhile the paper sensor 40 arranged along the transmitting path 21 also starts to detect the position and the velocity of the document. When the document is passing through the scanning unit 30, the scan sensor 42 will send a scan signal to the control unit 50, and after the control unit 50 receives the scan signal, the control unit 50 will control the scanning unit 30 to scan in response. Furthermore, when the transmitting state of the document (such as transmitting velocity) changes, the paper pass sensor 41 will send an adjusting signal to the control unit 50, and in response, the control unit 50 will adjust the scan frequency of the scanning unit 30. After the document finishes the scanning and leaves the scanning unit 50, all of the scan lines will be put together to form a complete image. By adjusting the scan frequency according to the transmitting state, the image calibrating device in this invention can solve the image defects effectively.

Figure 6:
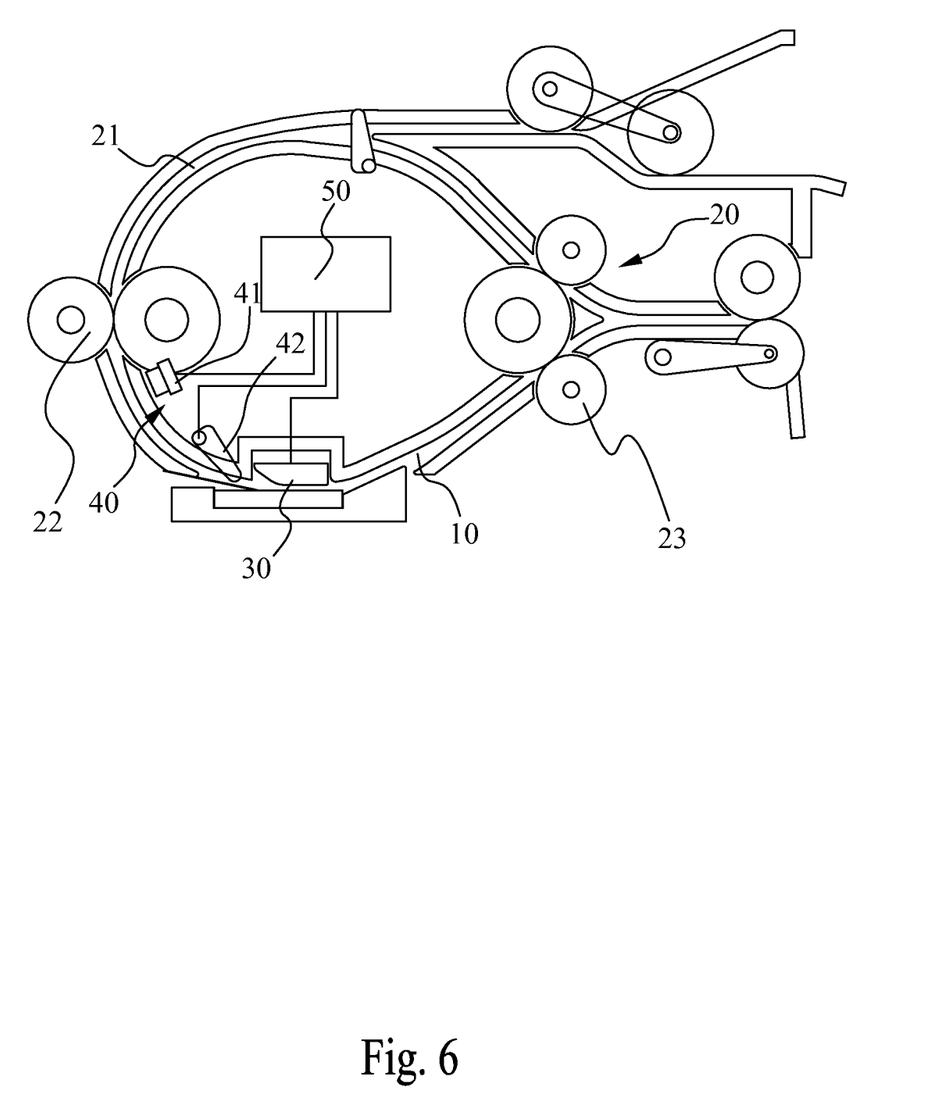
FIG. 6 shows a cross-sectional view of this invention when the scanning process begins.

In this embodiment, in order to prevent the document from prompt acceleration while the following end thereof leaves the first transmitting roller 22 and causes the scale of the scanned image to change, it is necessary to measure the moment when the document starts to accelerate, and the process is shown as follow:

Referring to FIG. 6, when the scanning unit 30 starts to scan, the scan sensor 42 is to monitor the leading end of the document. When the document is passing through the scanning unit 30, the scan sensor 42 will be triggered to send a scan signal to the control unit 50. After receiving the scan signal, the scanning unit 30 will start scanning in response.

Figure 7:
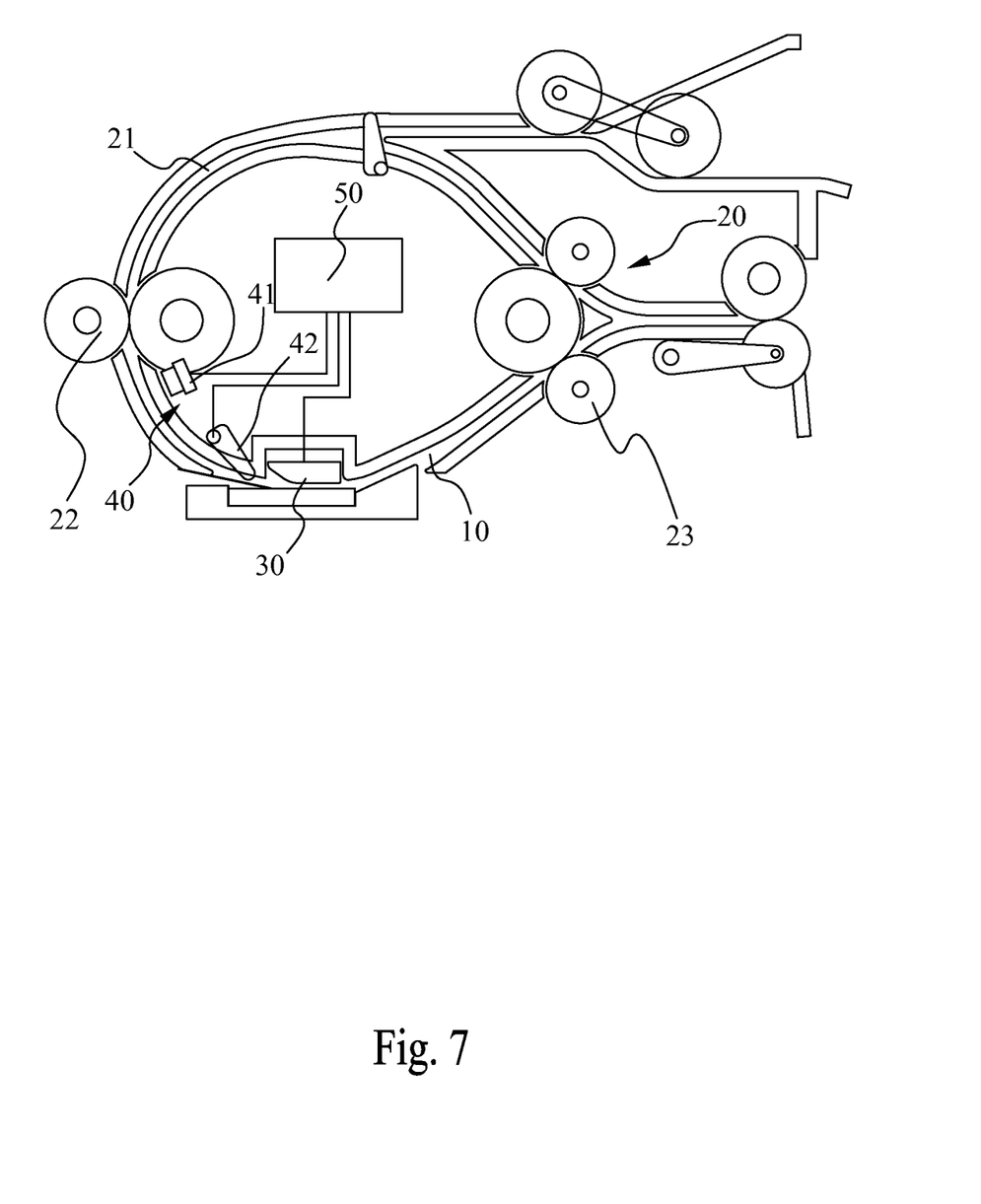
FIG. 7 shows a cross-sectional view of this invention when adjusting the scan frequency.

Referring to FIG. 7, because the document will accelerate instantly when the following end of the document leaves the first transmitting roller 22, it is possible to determine when the document will accelerate according to the leaving movement detection. In other words, the moment that the scan sensor 42 still can detect the document and the paper pass sensor 41 cannot detect the document is the moment that the document is going to accelerate. By then, the detection of the paper passing through the sensor 41 will send an adjusting signal to the control unit 50, and the adjusting signal requests the control unit 50 to increase the scan frequency of the scanning unit in response.

Figure 8:
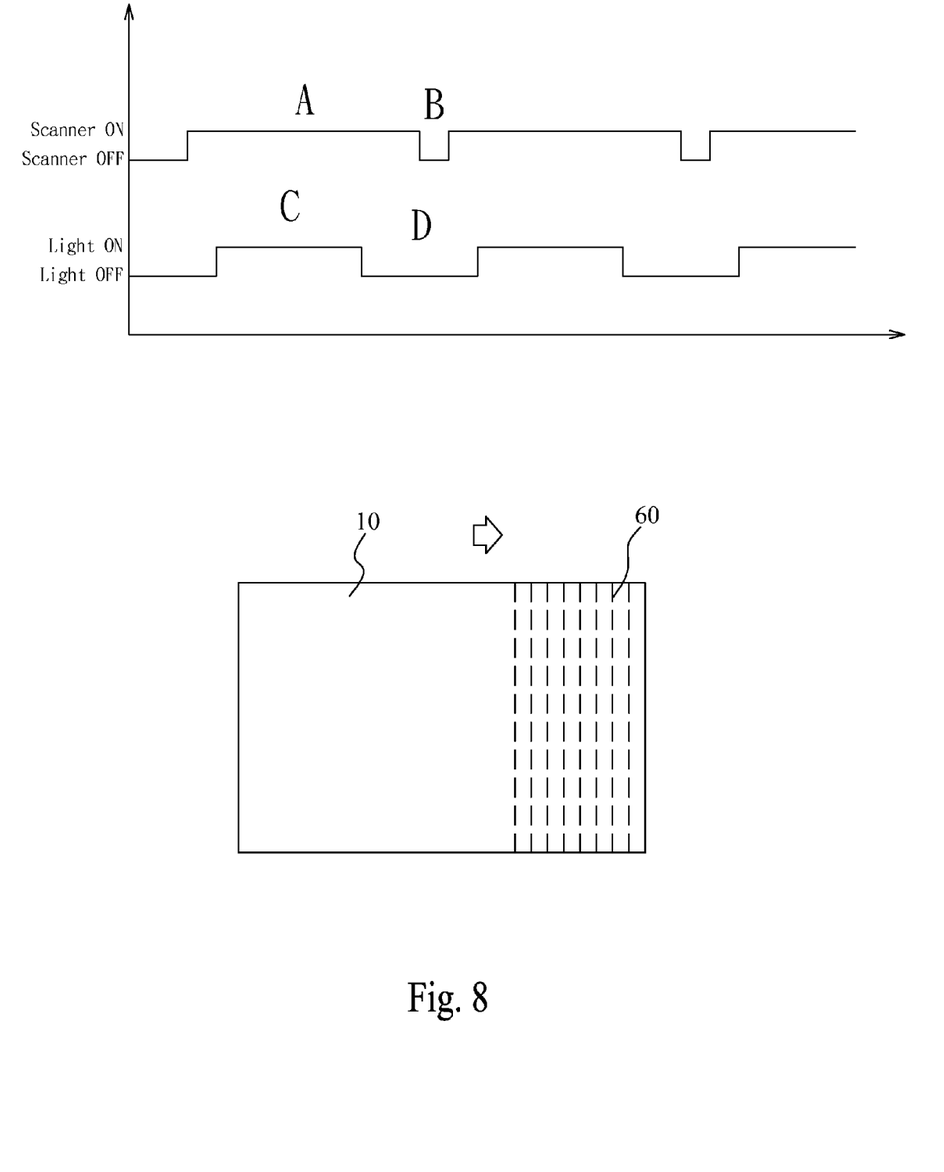
FIG. 8 and FIG. 9 are schematic diagrams that show the scan frequency changes according to the transmitting velocity.

Referring to FIGS. 6 to 9, in order to avoid the exposure value being changed on account of the scan frequency being accelerated, the process for adjusting the scan frequency in this embodiment is shown as follow:

Before the following end of the document 10 leaves the first transmitting roller 22, the scanning unit 30 scans the document 10 in original frequency. At this duration, the scanning unit 30 turns on and off intermittently, and for describing easily, the period that scanning unit 30 turns on will be defined as the first scan period (A), and the period that scanning unit 30 turns off will be defined as stop period (B) in the following description. Meanwhile the light source (not shown) also turns on and off intermittently to obtain the correct exposure, and the period that the light source turns on is defined as light on period (C) and the period that the light source turns off is defined as the first light off period (D). In this embodiment, the first scan period (A) is settled to eight units of time, the stop period (B) is settled to one unit of time, the light on period (C) is settled to five units of time and the first light off period (D) is settled to four units of time.

Figure 9:
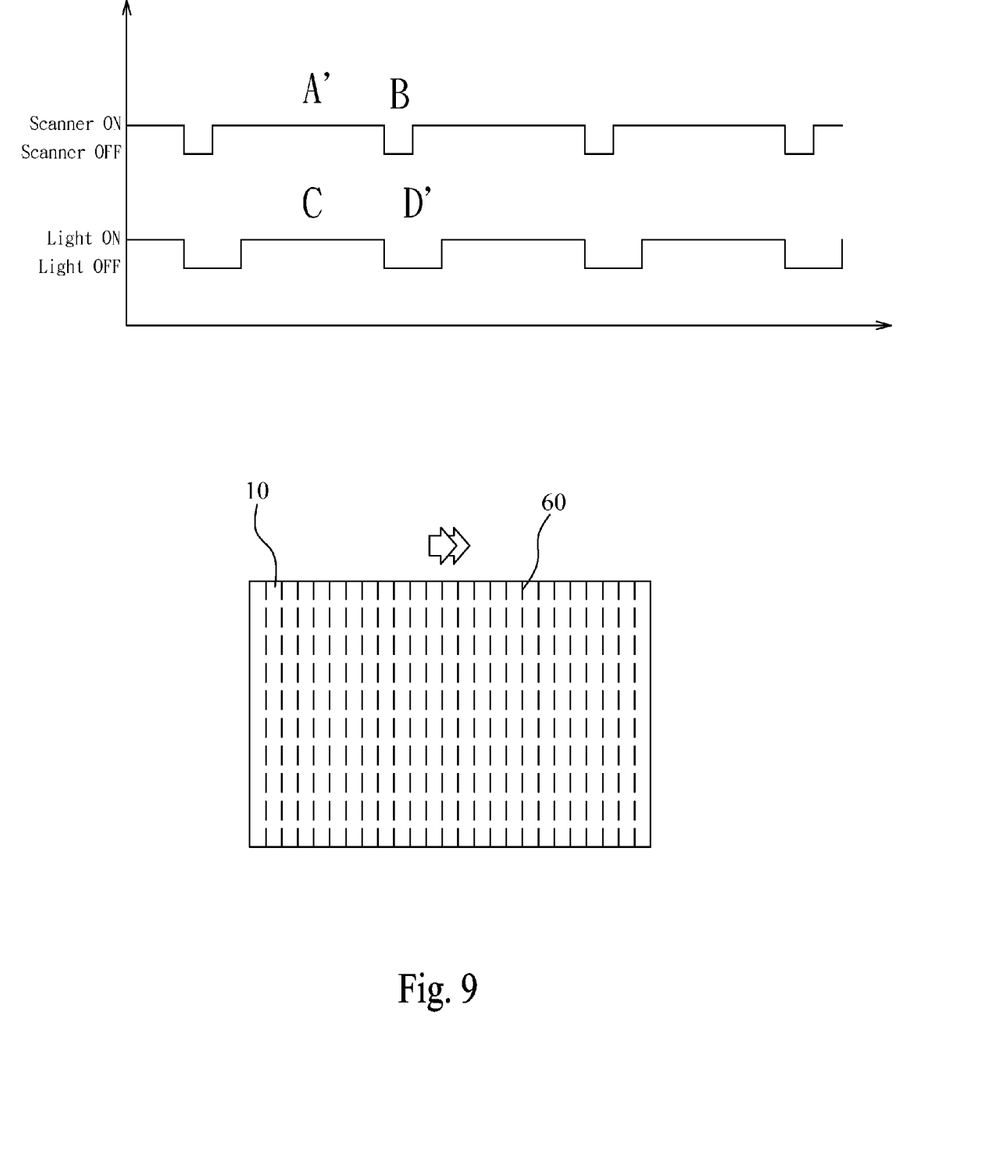

And when the following end of the document 10 leaves the first transmitting roller 22 and accelerates the document 10, the scan frequency will be increased to coordinate the velocity of the document 10. In this embodiment, the period that the scanning unit 30 remains turning on and the period that the light source remains turning off are changed by the same length of time, the adjusted period will be defined as the second scan period (A') and the second light off period (D') in the following description. In order to increase the scan frequency of the scanning unit 30, the second scan period is reduced to six units of time, the stop period still is one unit of time, the light on period also is unchanged to avoid changing the exposure value, and the second light off period is reduced to two units of time.

As a result, the changed value of scan period (A'-A) is equal to the changed value of light off period (D-D'), so the scan frequency and the flash frequency of the light source increase synchronously. And both the first and second scan periods (A, A') are longer than the light on period (C) which maintains constant. It makes the exposure value remain constant regardless of the change of the scan frequency.

In summary, the device in this invention calibrates scanned image by adjusting the scan frequency according to the transmitting state and the velocity changes of the document. Therefore, the image calibrating device in this invention doesn't have to use any additional actuator and components to prevent failure due to mechanical wear. Thus the image calibrating device in this invention is easy to be produced and maintain.

What is claimed is:

1. A scanned image calibrating device, comprising:
   a scanning unit arranged in a paper transmitting path for capturing texts and images on a document and transferring into electrical signals,
   a set of transmitting device including at least a first transmitting roller and a second transmitting roller that rotates faster than the first transmitting roller, the first transmitting roller being arranged upstream to the scanning unit, the second transmitting roller being arranged downstream to the scanning unit, the distance between the first and the second transmitting rollers being shorter than the length of the document, and no other transmitting roller being arranged between the first and the second transmitting rollers,
   a paper sensor arranged in the paper transmitting path for detecting position and velocity of the document, the paper sensor including a paper pass sensor and a scan sensor, the paper sensor being arranged next to the first transmitting roller and the scan sensor being arranged next to the scanning unit, and
   a control unit connected with the paper sensor and the scanning unit to adjust the scan frequency in response to the position and the velocity of the document,
   wherein the scan sensor is a micro switch and the paper pass sensor is an ultrasonic sensor.

2. A scanned image calibrating method, including:
   transmitting a document through a scanning unit page by page with first and second transmitting rollers, meanwhile detecting position and velocity of the document with a document sensor, the document sensor including a paper pass sensor and a scan sensor,
   starting the scanning unit to capture texts and images on the document when the document sensor detects the document being passing through the scanning unit, and
   adjusting a scan frequency of the scanning unit when the document sensor detects change in transmitting state or velocity of the document;
   wherein adjusting the scan frequency in response to the transmitting state change of the document includes the steps of:
      sending a scan signal to a control unit when the scan sensor detects a leading end of the document,
      starting the scanning unit for capturing the texts and images on the document in response to the scan signal,
      sending an adjusting signal to the control unit when the scan sensor still detects the document but the paper pass sensor detects that a following end of the document leaves, and
      adjusting the scan frequency of the scanning unit in response to the adjusting signal by performing the process including:
         turning the scanning unit and a scanning light source on and off intermittently before the following end of the document leaves the first transmitting roller, wherein a period that the scanning unit turns on is defined as a first scan period, the period that the scanning light source turns on is defined as a light on period and the period that the scanning light source turns off is defined as a first light off period, and
         adjusting the periods that the scanning unit and the scanning light source turn on and off after the following end of the document leaves the first transmitting roller, wherein the scanning unit turns on with a second scan period, and the scanning light source turns off with a second light off period;
      wherein difference between the first scan period and the second scan period is settled equal to the difference between the first light off period and the second light off period to make the scan frequency of the scanning unit and a flashing frequency of the scanning light source synchronous, and the first scan period and the second scan period both are longer than the light on period which stays constant to make exposure of the document stay constant regardless of the change in the scan frequency.

* * * * *